United States Patent
Dimpsey et al.

(10) Patent No.: US 6,792,601 B1
(45) Date of Patent: Sep. 14, 2004

(54) MULTIPLE MODE OBJECT LOCKING METHOD AND SYSTEM

(75) Inventors: Robert Tod Dimpsey, Travis, TX (US); Benjamin Joseph Hoflich, Austin, TX (US); Brian David Peacock, North Baddlesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,137

(22) Filed: May 18, 2000

(51) Int. Cl.[7] .............................. G06E 9/455; G06E 9/46
(52) U.S. Cl. ...................... 718/102; 711/205; 711/206; 718/101; 718/103; 718/104; 710/200
(58) Field of Search ................................. 709/100, 101, 709/102; 711/106, 105; 710/200; 718/101, 102, 103, 104

(56) References Cited

U.S. PATENT DOCUMENTS

| | | | | |
|---|---|---|---|---|
| 3,940,745 A | * | 2/1976 | Sajeva | 710/244 |
| 4,949,247 A | * | 8/1990 | Stephenson et al. | 712/6 |
| 5,265,223 A | * | 11/1993 | Brockmann et al. | 710/123 |
| 5,560,003 A | * | 9/1996 | Nilsen et al. | 707/206 |
| 5,706,515 A | | 1/1998 | Connelly et al. | 395/676 |
| 5,797,004 A | | 8/1998 | Lindholm et al. | 395/674 |
| 5,818,464 A | * | 10/1998 | Wade | 345/501 |
| 5,946,487 A | * | 8/1999 | Dangelo | 717/148 |
| 6,493,599 B2 | * | 12/2002 | King et al. | 700/100 |

FOREIGN PATENT DOCUMENTS

| | | | |
|---|---|---|---|
| CA | 2222389 | 5/1999 | |
| EP | 0783150 | 7/1997 | G06F/9/44 |
| EP | 0840215 | 5/1998 | G06F/9/46 |
| EP | 0955584 | 11/1999 | G06F/9/46 |
| WO | 98/33119 | 7/1998 | G06F/9/46 |
| WO | 98/44401 | 10/1998 | |

OTHER PUBLICATIONS

U.S. patent application Ser. No. 08/937,311, Bacon, filed Jul. 17, 1997.
"Thin Locks: Featherweight Synchronization for Java" by D F Bacon, R. Konuru, C Murthy, M Serrano—SIGPLAN '98, Montreal, Canada pp258–268.
"Java server performance: A case study of building efficient, scalable Jvms" by R Dimpsey, R Arora and K Kuiper, IBM Systems Journal vol. 39, No. 1, Jan. 2000.
"The evolution of a high–performing Java virtual machine" by W Gu, N A Burns, M T Collins and W Y P Wong, IBM Systems Journal vol. 39, No. 1, Jan. 2000.
"A study of locking objects with Bimodal fields" by Tamiya Onodera and Kiyokuni Kawachiya, OOPSLA'99 Conference Proceedings, pp223–237, Denver, Colorado, USA, Nov. 1999.

* cited by examiner

*Primary Examiner*—Meng-Al T. An
*Assistant Examiner*—Nilesh Shah
(74) *Attorney, Agent, or Firm*—Leslie A. VanLeeuwen

(57) ABSTRACT

An object-based multi-threaded computing system has a cyclic garbage collection strategy and includes an object locking system having (i) a first mode in which access by a single thread without contention to an object is controlled by a monitor internal to said object, and (ii) a second mode in which access by multiple threads with contention to said object is controlled by a monitor external to said object. For any given object a transition from the first mode to the second mode is termed inflation, and a transition from the second mode to the first mode is termed deflation. Responsive to the start of a period of contention for an object in said first mode, the object is inflated to the second mode, and an inflation rate counter is incremented. After the period of contention has concluded the value of the inflation rate counter is compared against a predetermined value in order to determine whether or not to deflate the object. The inflation rate counter is reset at every garbage collection cycle.

20 Claims, 4 Drawing Sheets

MULTIPLE MODE OBJECT LOCKING METHOD AND SYSTEM

FIELD OF THE INVENTION

The present invention relates to an object-based computing system including an object locking system having at least two modes for controlling access to an object, and more particularly to controlling transitions between said at least two modes.

BACKGROUND OF THE INVENTION

Programs written in the Java programming language (Java is a trademark of Sun Microsystems Inc) are generally run in a virtual machine environment, rather than directly on hardware. Thus a Java program is typically compiled into byte-code form, and then interpreted by the Java virtual machine (JVM) into hardware commands for the platform on which the JVM is executing. An important advantage of this approach is that Java applications can run on a very wide range of platforms, providing of course that a JVM is available for each platform. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

One of the advantages of the Java language is that creating multi-threaded applications is relatively easy. This is partly because the locking concept within the Java language is simplified for the end-programmer; there is no need at the application level to specifically code lock and unlock operations. Of course locking is important for multi-threaded applications to avoid conflicts between different threads in terms of access to and manipulation of resources (which in the Java environment are referred to as objects). Thus while one thread owns a lock on an object, no other thread may perform any operation upon that object which also requires a lock on the object. This is the principle of mutual exclusion—if a thread attempts to lock an object and discovers that the object is already locked, it may not perform operations on that object until it can acquire ownership of the lock.

Controlling concurrent access to data structures is a fundamental problem in computing, for both uniprocessor and multiprocessor systems (in multiprocessor systems access may be truly concurrent; in uniprocessor systems interrupts and time slicing may occur in the midst of an operation that must be atomic to maintain correctness).

One way to implement efficient locks is to use spin locking. Typically in this approach, each lockable object contains a one-word owner field. When a thread needs to lock an object, it just goes into a loop that repeatedly tests if the object is unlocked (lock=0), and if it is unlocked it attempts to claim the lock by setting the lock field to its own thread identifier (thread).

Spin locking has a number of major advantages: it is simple to implement; it requires only one word of space overhead in the object; and if locks are released quickly it is very efficient. However, spin locking also suffers from some major disadvantages, particularly on a uniprocessor. If locks are not released quickly, or if contention for shared objects is high, then a large amount of computation will be wasted in "spinning". On a uniprocessor, the spin-lock loop is usually modified so that the processor is yielded every time the lock acquisition fails, in order that the thread does not waste an entire time slice in spinning while other threads are waiting to run.

With spin-locking, the queues for the objects being locked are essentially encoded in the thread scheduler. When there is not much locking, this works very well. When locking is frequent and/or contention is high, then on a uniprocessor a great deal of time is wasted in scheduling threads which immediately yield again because they still can not acquire the desired lock. On a multiprocessor, a lot of excess traffic to main memory is generated by spin-locking, and this also degrades performance. A good summary and investigation of the multiprocessor performance issues is The Performance of Spin Lock Alternatives for Shared-Memory Multiprocessors, by T. E. Anderson, IEEE Transactions on Parallel and Distributed Systems, volume 1, number 1, January 1990.

The primary alternative to spin-locking is queued locking. When a thread fails to obtain a lock on an object, it places itself on a queue of threads waiting for that object, and then suspends itself. When the thread that owns the lock releases the lock, it checks if any threads are enqueued on the object. If so, it removes the first thread from the queue, locks the object on behalf of the waiting thread, and resumes the waiting thread.

Unlike spin-locking, queued locking is fair. However, unless a two-level locking scheme is employed (as described below), the time needed to acquire an uncontested queued lock is more expensive than for a spin lock. Performance is especially poor if objects are locked often, typically for short periods of time, and with contention. In this case the overhead of enqueuing and suspending becomes a factor. However, when objects are locked for longer periods of time and contention is low, queued locking is generally more efficient than spin-locking.

A problem with queued locking has to do with the management of the queues. The queues for a shared object are themselves shared objects (even while the object is locked). Therefore, some sort of mechanism is required to assure mutual exclusion on the object queues. Furthermore, there is a race condition inherent in the lock release policy: one thread may attempt to enqueue for the object at the same time that the owning thread is releasing the lock. The simplest way to solve both of these problems is to use a global spin-lock to guard the short critical sections for lock acquisition, release, and enqueuing. Every object now contains not only a lock field but also a queue field. Unfortunately, locking an unlocked object (the most common case) has now become significantly slower and more complex. There is also a global lock for which there could be significant contention as the number of threads increases (that is, the solution does not scale).

Java implementations have generally adopted a queued locking model based on the concept of monitors which can be associated with objects. A monitor can be used for example to exclusively lock a piece of code in an object associated with that monitor, so that only the thread that holds the lock for that object can run that piece of code—other threads will queue waiting for the lock to become free. The monitor can be used to control access to an object representing either a critical section of code or a resource.

Locking in Java is always at the object-level and is achieved by applying a "synchronized" statement to those code segments that must run atomically. The statement can be applied either to a whole method, or to a particular block of code within a method. In the former case, when a thread in a first object invokes a synchronised method in a second object, then the thread obtains a lock on that second object. This lock covers all the methods in that second object (this may or may not be desirable depending on the application). The alternative of including a synchronised block of code within the method allows the lock to be held by taking ownership of the lock of an arbitrary object, which is specified in the synchronised command. If such an arbitrary object is used for the lock, this lock does not prevent execution of any other methods in the second object.

One consequence of the latter approach is that any Java object may be specified for locking, not just those involving synchronised code. This is important because it means that the space available in objects for implementing locking is tightly constricted; otherwise much space is wasted supporting locking in many very small objects that in fact are never likely to be locked.

The monitor structure in Java can also be used as a communication mechanism between separate threads of execution. This is achieved by a first thread including a "wait" command within synchronised code. This suspends execution of this first thread, and effectively allows another thread to obtain the lock controlling access to this synchronised code. Corresponding to the "wait" command is a "notify" command in synchronised code controlled by the same object lock. On execution of this "notify" command by a second thread, the first thread is resumed, although it will have to wait for access to the lock until this is released by the second thread. Thus when used for this purpose a thread may wait on an object (or event) and another thread can notify the waiter.

The usage of monitors in the execution of Java code is extensive. As noted above monitors are used frequently as programming constructs in user code, and Java class libraries included with JVMs make heavy use of monitors. In addition, the core JVM, which itself is partially written in Java, exploits the underlying locking structure to protect critical resources. Consequently, even single threaded applications can heavily utilise monitors, since the underlying Java libraries and core virtual machine are written to multi-thread.

Given the extensive use of the monitor structure in Java, the performance of the implementation is crucial to overall Java system performance. In this case performance is measured by the amount of time an acquire and release of a Java monitor consumes. The most important situation for performance, since it is by far the most common, is when a monitor is acquired without contention. That is, a thread successfully requests the monitor without blocking or waiting for another thread to release it.

Much work has been done on the design of Java object monitors. U.S. Pat. No. 5,797,004 describes the provision of a cache (pool) of synchronisation constructs (i.e. monitors). WO 98/44401 describes a way of locating a synchronisation structure associated with an object by searching first a local table and then a global table. EP-A 783150 describes providing local and global locking structures, the former being used for frequently locked objects to improve speed. U.S. Pat. No. 5,706,515 describes the provision of wait/notify by monitors. EP-A-840215 describes a system where a stack is used for synchronisation. A thread writes an object header into a stack, and can also update the stack with a reference indicator to the relevant stack. Access via the stack can be quicker than via standard monitors. Somewhat similarly, EP-A-955584 describes a synchronisation method for Java in which shared object identifications are put on a stack by a thread to indicate ownership. Canadian patent application 2222389 describes the use of monitor transition vectors to control the locking of objects by threads. WO98/33119 teaches the use of a register to store pairs of lock information, each pair including an identifier of a lock for an object, and also a count for that lock.

Of greater relevance to the present invention is U.S. patent application Ser. No. 08/937311 filed 17 Jul. 97 (IBM docket number YOR9-1997-0225), and in particular the related publication "Thin Locks: Featherweight Synchronisation for Java" by Bacon, Konuru, Murthy, and Serrano, SIGPLAN '98, Montreal Canada, p258–268. These documents teach the concept of a light-weight "flat" (or thin) monitor that can be incorporated into a single word within the header space available in a conventional Java object. The flat monitor can be used for the most common, simple case whereby a lock is obtained by a thread without contention from other threads, so no waiting/queuing is required. Essentially the flat monitor word includes three fields; firstly a single mode bit to determine whether the monitor is operating as a thin monitor, or as a conventional "fat" monitor (see below); secondly, a unique thread-id which identifies the owning thread (or zero if it is unowned); and finally a field to indicate how many times the same thread has currently locked the object. Thus this design accommodates recursive locking by the same thread up to a certain limit (based on the size of the third field). The single word of the flat monitor can then be tested and updated by the use of simple instructions that guarantee consistency and atomic updates (such as Compare and Swap on S/390).

If a thread tries to obtain a lock that is already held or if the monitor is required for a "wait/notify" call then the flat monitor cannot be used, since it does not contain enough complexity to handle queues of waiting threads. At this point a heavyweight "fat" monitor is assigned that can handle all these tasks. The flat monitor is then converted by changing the mode bit of the first field to indicate that a fat monitor is now being used, and by combining the second and third fields to provide a pointer to the associated heavyweight monitor. This heavyweight monitor is known as an "inflated" monitor and the switch to using the inflated monitor instead of the flat monitor is known as "inflation".

The process of inflation occurs as follows. A first thread tries to access an object, and discovers that it is currently owned by a second thread. This contention is the trigger for inflation. However, the first thread cannot initiate the inflation because it does not own the object. Rather, it has to enter into a spin-locking or spin-blocking loop until the lock is released by the second thread. The contending thread may then acquire the thin lock, and only at this point can the fat lock be created, with the mode bit and the monitor pointer being set appropriately. One consequence of this bi-modal use of the lock word is that any access to an object lock first tests the mode bit to determine whether a flat monitor or a fat monitor is being used; based on this information it can then proceed to interpret the rest of the lock word appropriately. (It will be appreciated that all this extra functionality for locking is performed by the underlying JVM transparently to the application).

Further details on the use of these bi-modal monitors in the IBM JVM implementation can also be found in the papers: "Java Server Performance: A Case Study of Building Efficient, Scalable JVMs", by Dimpsey, Arora, and Kuiper, and "The evolution of a high-performing Java virtual machine", by Gu, Burns, Collins, and Wong, both in the IBM Systems Journal, Vol 39/1, January 2000.

One unfortunate aspect of the above model is that once inflation has occurred it persists for the life of the object, even after all locks on it have been removed. Consequently, the code paths for any lock/unlock are greatly increased, even for the simple case whereby a thread obtains an unowned monitor, since now the heavyweight monitor mechanism must be used. Therefore, the high performance case introduced through flat locks occurs only if the monitor is in the flat mode (i.e. has never been inflated). Once inflation has occurred, perhaps as a result of one short burst of initial activity, the lower performing monitor implementation must be employed. This is particularly disadvantageous in a server environment, where a JVM may run for a long time, and there is the possibility that more and more objects will go into the inflated state.

This problem is addressed in a paper: "A Study of Locking Objects with Bimodal Fields" by Onodera and Kawachiya, OOPSLA'99 Conference Proceedings, p223–237, Denver Colo., USA, November 99. At a high-level, this proposes "deflation", which is the transition from a fat monitor back to a flat or thin monitor, in association with so-called "Tasuki Monitors". These are based on the bi-modal monitors described above, but with certain modifications. In particular, Tasuki monitors avoid spin-waiting during inflation by means of an extra bit, termed an "flc" bit, which is stored in the object header (in a different word from that used to store the lock information). This implementation also assumes that the fat monitor for locking any given object can be directly determined from the object id by means of a hash table or similar.

In Tasuki monitors inflation is again triggered when a thread fails to get access to an object, but the process is somewhat different from that described in the above-mentioned paper by Bacon et al. Thus when a first thread fails to obtain direct access to an object, in other words if the object is either (i) already inflated, or (ii) not inflated but owned by some second thread, it first determines the (fat) monitor identity corresponding to the object, and then tries to enter that monitor. If the object is already inflated as determined from the mode bit (ie the former possibility above), access to the object will now be controlled in accordance with standard monitor operation. On the other hand, if the object has not been inflated, the first thread sets the flc bit and now goes into a wait state on the (fat) monitor. When the second thread subsequently finishes with the object, then as part of the standard lock release process, it tests the flc bit, and finds that it has been set. This triggers the second thread to enter the fat monitor for the object, and wake up the first thread. This can now inflate the object, by clearing the flc bit, changing the mode bit, and writing the monitor pointer into the object header. Thus Tasuki monitors use wait/notify internally to control monitor inflation; the paper by Onodera demonstrates that this does not conflict with the (external) use of the same monitor to perform standard Java wait/notify synchronisations between threads.

Of particular relevance to an understanding of the present invention is that Tasuki monitors also support the concept of deflation. Thus when a thread exits an object that is inflated (as indicated by the mode bit), it will, subject to certain conditions described in more detail below, return the object from using a fat monitor to a thin monitor. This is accomplished by simply changing the mode bit in the object header and writing a null value into the owning thread identifier to replace the monitor pointer. Note that the fat monitor itself does not need to be altered.

As described in the Onodera et al paper, for deflation it is first necessary that the lock is being freed and that no objects are waiting for a notify from the monitor. This is effectively represented by the code of line 34 in FIG. 5 of Onodera. It is further suggested that additional criteria can be employed for determining whether to deflate: "As long as the necessary condition is satisfied, tasuki lock allows selective deflation . . . . For instances we can deflate lock words on the basis of dynamic or static profiling information" (see section 3).

In order to determine when best to deflate, Onodera divides objects that are inflated into two groups. The first (the "nowait" group) is only involved in mutual exclusion by monitor enter and exit (i.e. standard synchronisation), whereas the second (the "wait" group) includes application wait/notify operations. Onodera only performs deflation on objects in the "nowait" group. This is accomplished by simply adding a wait-counter to an object monitor, the counter being incremented whenever the wait_object function is called. Thus deflation is not performed on any object for which the wait-counter is non-zero.

The rationale for this approach is the recognition that rapidly repeated inflation/deflation cycles will have an adverse effect on machine performance ("thrashing"). Thus an object should be left inflated if deflation would be followed by imminent re-inflation, in other words if the intervals between periods of contention for the object are short (a property termed "locality of contention"). Onodera presents experimental data to indicate that this condition is met by objects in the wait group, but not by objects in the nowait group. Consequently, it is only objects in the latter group (as indicated by a zero wait-counter) that are deflated at the end of a period of contention. Further experimental data is adduced to show that thrashing is not a problem in such an implementation.

Nevertheless, the results in Onodera are derived from relatively simple test cases and may not scale to more realistic and complex scenarios. Thus a more comprehensive approach to the treatment of bi-modal locks remains to be developed.

SUMMARY OF THE INVENTION

Accordingly, the present invention provides a method of operating an object-based multi-threaded computing system having a cyclic garbage collection strategy and including an object locking system having (i) a first mode in which access by a single thread without contention to an object is controlled by a monitor internal to said object, and (ii) a second mode in which access by multiple threads with contention to said object is controlled by a monitor external to said object, and wherein for any given object a transition from the first mode to the second mode is termed inflation, and a transition from the second mode to the first mode is termed deflation, said method including the steps of:

entering a period of contention for an object in said first mode;

inflating said object to said second mode;

updating an inflation rate value for said object;

ending a period of contention for said object;

comparing the inflation rate value against a first predetermined value;

deflating or not deflating said object, based on the result of the comparison; and resetting the inflation rate value at the next garbage collection cycle of the system.

In a preferred embodiment the inflation rate value, which is stored in the monitor external to said object, represents the number of inflation/deflation cycles between two successive garbage collection cycles. The updating step increments the inflation rate value for each inflation, except where there is no internal use of the wait/notify construct, since inflation will then occur quickly with relatively minor performance degradation. This exception can occur for two reasons: (i) because inflation results from an application wait/notify operation being performed on the object, and (ii) (more unusually) because the thread that had originally locked the object to cause contention releases it very quickly (before the internal wait/notify is set up). It is preferred that the inflation rate value is not incremented in either case (although the existence of the second case may be implementation dependent).

Also in the preferred embodiment the step of resetting the inflation rate counter is not performed if the inflation rate value is greater than a second predetermined value, except that on a periodic basis (for example, every K garbage collection cycles), the inflation rate value is reset irrespective of whether or not the inflation rate value is greater than the second predetermined value. The second predetermined value is typically set equal to said first predetermined value.

The invention further provides a computer program product, comprising computer program instructions typically recorded onto a storage medium or transmitted over a network, for implementing the above methods.

The invention further provides an object-based multi-threaded computing system having a cyclic garbage collection strategy and including an object locking system having (i) a first mode in which access by a single thread without contention to an object is controlled by a monitor internal to said object, and (ii) a second mode in which access by multiple threads with contention to said object is controlled by a monitor external to said object, and wherein for any given object a transition from the first mode to the second mode is termed inflation, and a transition from the second mode to the first mode is termed deflation, said computer system including:

means for entering a period of contention for an object in said first mode;

means for inflating said object to said second mode;

means for updating an inflation rate value for said object;

means for ending a period of contention for said object;

means for comparing the inflation rate value against a first predetermined value;

means for deflating or not deflating said object, based on the result of the comparison; and means for resetting the inflation rate value at the next garbage collection cycle of the system.

The invention further provides a computing system having:

a plurality of objects, each object including an internal monitor to control access to said object in a first mode of object locking;

a plurality of monitors, each monitor controlling access to a corresponding one of said plurality of objects in a second mode of object locking, and including an inflation counter which is incremented by a transition from said first mode of object locking to said second mode of object locking; and a garbage collector including means for resetting said inflation counter.

The invention addresses the problem that deflation in the prior art is controlled very crudely. Thus in the Onodera et paper, all objects in the "nowait" group are deflated at the end of contention, but none of the other objects. For the best results object monitors should not be left inflated unnecessarily, but yet should not be deflated too eagerly, only to be inflated again a short time later.

As taught herein, the past history of the monitor can be leveraged in the decision as to whether the state of the monitor should be changed. In this way, a self-tuning of the transition is made for optimal performance. In a preferred embodiment a counter is kept in the inflated monitor structure and this counter is incremented on each of the slow inflation transitions. At the point of deflation the total number of expensive inflations is then known. This information is then used to decide whether the deflation should or should not be performed. Note however, that by itself this does not lead to an ideal solution because given a long enough running time most monitors will accrue a large number of the expensive inflations. Therefore the preferred embodiment utilises a rate instead of a raw number. This rate is construed not in the normal sense of operations per time but rather as operations per memory-usage. The memory usage rate is easier to implement than a time rate, since garbage collections are generally required after a given amount of memory usage and at this point the monitor structures are traversed. It is simple to clear the transition counters at this point. If a counter is above a given threshold then the counter is not cleared. Consequently, monitors that have encountered more expensive inflations since the last garbage collection continue to be flagged with their expensive inflation count.

When the decision point for deflation is approached, the count in the inflated monitor structure is consulted. If the count is too large then deflation is not performed and the expensive operation (inflation) is avoided in the future. A simplified view would be to allow a monitor to exist in a state which allows transitions and another state which does not allow transitions. Once a monitor was moved to the state which did not allow transitions then it would stay in that state. However, this is too rigid a solution for most situations. In the preferred embodiment, the counters kept in the inflated monitor are cleared after a certain number of garbage collections even if the rate of inflation/deflation is above the threshold.

We can generalise the above to consider a mechanism to identify the ideal transition point between multi-state monitors or synchronization devices that may exist in multiple states where each of the states has different performance considerations. Denoting the states S1, S2, S3, ... SN, with state S1 having the best performance and state N having the worst performance, transitions are made between states next to each other, i.e. S(n) to S(n+1) and back. In the preferred embodiment, there is the flat lock (S1) and the inflated lock (S2). The general solution represents keeping an array of counters in the synchronization structure to count the number of transitions between adjacent states. When a threshold is surpassed the transition is no longer made. The rate stored in the counters may involve memory usage or some other easy to acquire metric.

BRIEF DESCRIPTION OF THE DRAWINGS

A preferred embodiment of the invention will now be described in detail by way of example only with reference to the following drawings.

DETAILED DESCRIPTION

Figure 1:
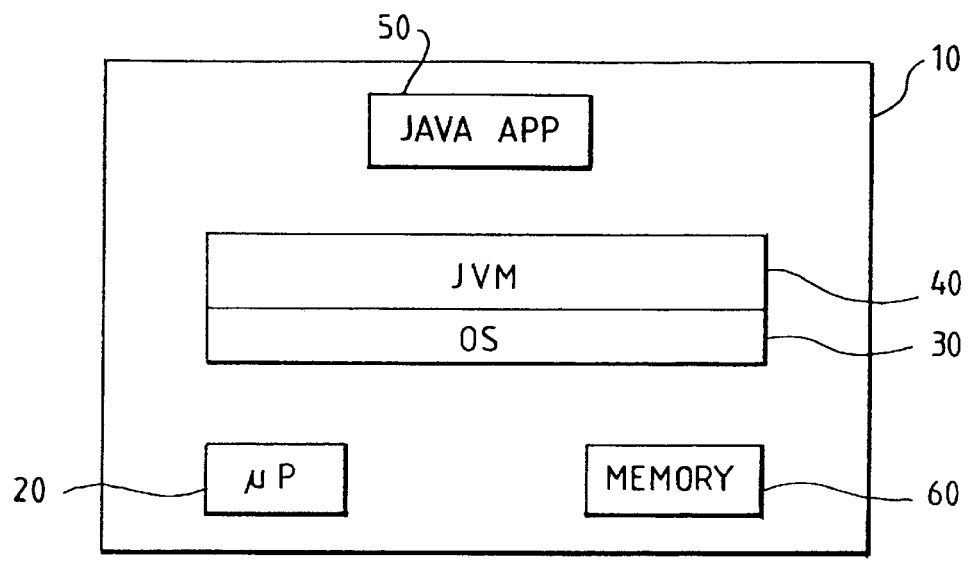
FIG. 1 is a schematic drawing of a computer system supporting a Java virtual machine (JVM)

FIG. 1 illustrates a computer system 10 including a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem connection, typically via a hard disk drive (also not shown). Computer system 10 runs an operating system (OS) 30, on top of which is provided a Java virtual machine (JVM) 40. The JVM looks like an application to the (native) OS 30, but in fact functions itself as a virtual operating system, supporting Java application 50.

It will be appreciated that computer system 10 can be a standard personal computer or workstation, minicomputer, mainframe, or any other suitable computing device, and will typically include many other components (not shown) such as display screen, keyboard, sound card, network adapter cart, etc which are not directly relevant to an understanding of the present invention. Note that computer system 10 may also be an embedded system, such as a set top box, or any other hardware device including a processor 20 and control software 30, 40.

Figure 2:
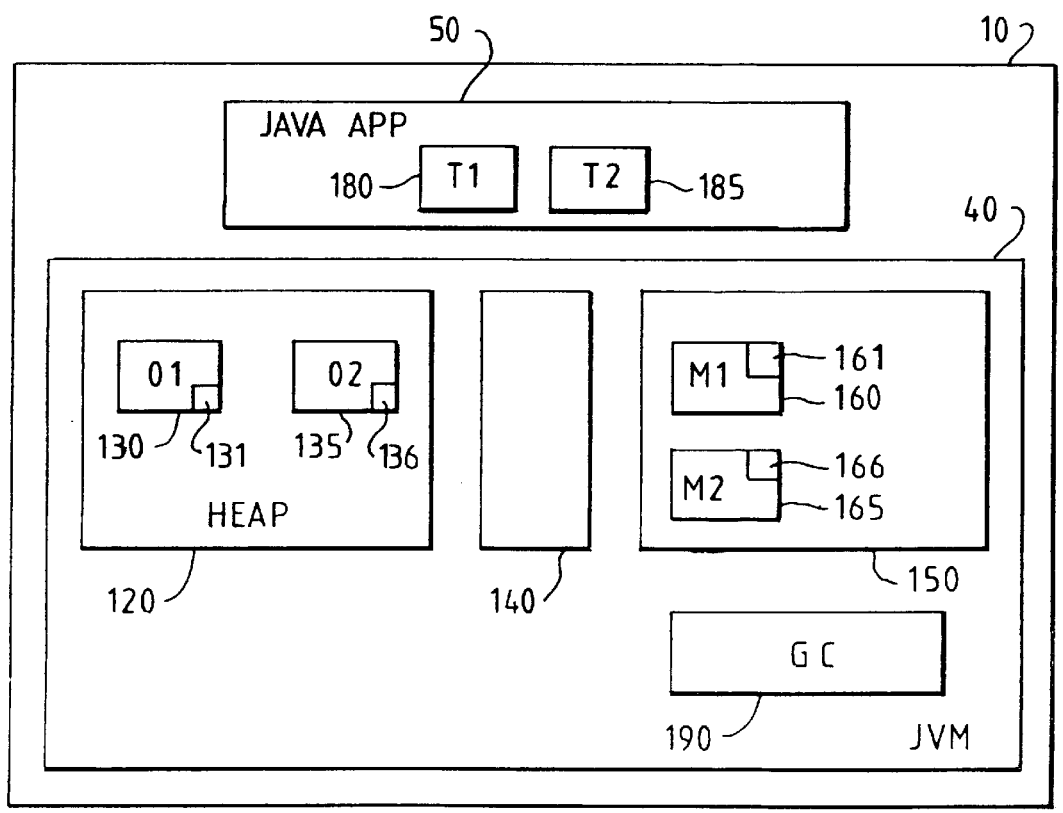
FIG. 2 is a schematic diagram showing the JVM in more detail.

FIG. 2 shows the JVM 40 and Java application 50 in more detail. Thus Java application 50 includes multiple threads, T1 180 and T2 185. These threads are run in parallel by JVM 40, thereby giving rise to possible contention for resources between T1 and T2. As mentioned previously, such contention can even arise when Java application 50 is single-threaded, because some of the JVM which runs Java application 50 is itself written in Java and contains multiple threads.

Looking now at the JVM, this includes a heap 120 which is used for storing multiple objects, O1 130 and O2 135. There is also a pool 150 of monitors, including monitors M1 160 and M2 165. Within each monitor is a data field 161, 166 respectively whose purpose will be described in more detail below. Hash table 140 can be used to ascertain the monitor corresponding to a particular object id.

The JVM also includes a garbage collection (GC) facility 190. Thus in the Java programming language, applications do not need to specifically request or release memory, rather this is controlled by the JVM. Therefore, when Java application 50 creates an object 130, the JVM secures the requisite memory resource. Then, when Java application 50 finishes using object 130, the JVM can delete the object to free up this memory resource. This latter process is known as garbage collection, and is generally performed by briefly interrupting all threads 180, 185, and scanning the heap 120 for objects which are no longer referenced, and hence can be deleted. The details of garbage collection vary from one JVM implementation to another, but typically GC is scheduled when the heap is nearly exhausted and so there is a need to free up space for new objects.

It will be appreciated of course that FIG. 2 is simplified, and essentially shows only those components pertinent to an understanding of the present invention. Thus for example the heap may contain thousands of Java objects in order to run Java application 50, and the JVM contains many other components (not shown) such as class loaders etc.

The JVM 40 supports a bimodal locking system as previously described to control contention in terms of access to objects O1 and O2. In a first mode, such access is controlled via a monitor field 131, 136 internal to the object itself. This monitor is extremely compact and permits very fast access. However, because of its limited size it cannot manage contention for the object. Thus in a second mode access is controlled via an external monitor, i.e. a monitor M1, M2 in the pool 150. When contention occurs for the object, the JVM inflates the object from the first mode to the second mode (unless of course it is already in the second mode). There are two possible reasons for such contention, either a single thread wants to use the wait/notify construct on the object, or a first thread wants to synchronise on an object already owned by a second thread. Hereinafter the former of these will be referred to as "fast" inflation, in that such inflation can be performed immediately. Conversely, the latter will be referred to as "slow" inflation, in that the first thread has to wait until the object is relinquished by the second thread before the monitor can be fully inflated.

In fact, in the second case there is one exception in which inflation still occurs quickly. Thus in the preferred embodiment, which follows the inflation model of Onodera, the object under contention is retested immediately before the internal wait/notify operation to see if it has become available, in other words to see if it has already been relinquished by the first thread (see line 12 of FIG. 5 of the Onodera et al paper). If so, inflation can again be performed at once, without having to utilise the internal wait/notify. Thus this situation is also regarded as fast inflation, even although it actually stems from contention for lock ownership. Note that this exception is typically relatively rare compared to slow inflation.

It will be appreciated that therefore that the terminology of "slow" and "fast" simply reflects differences in the timing of inflation, rather than indicating any difference in the endpoint, which is the same for both fast and slow inflation.

Figure 3:
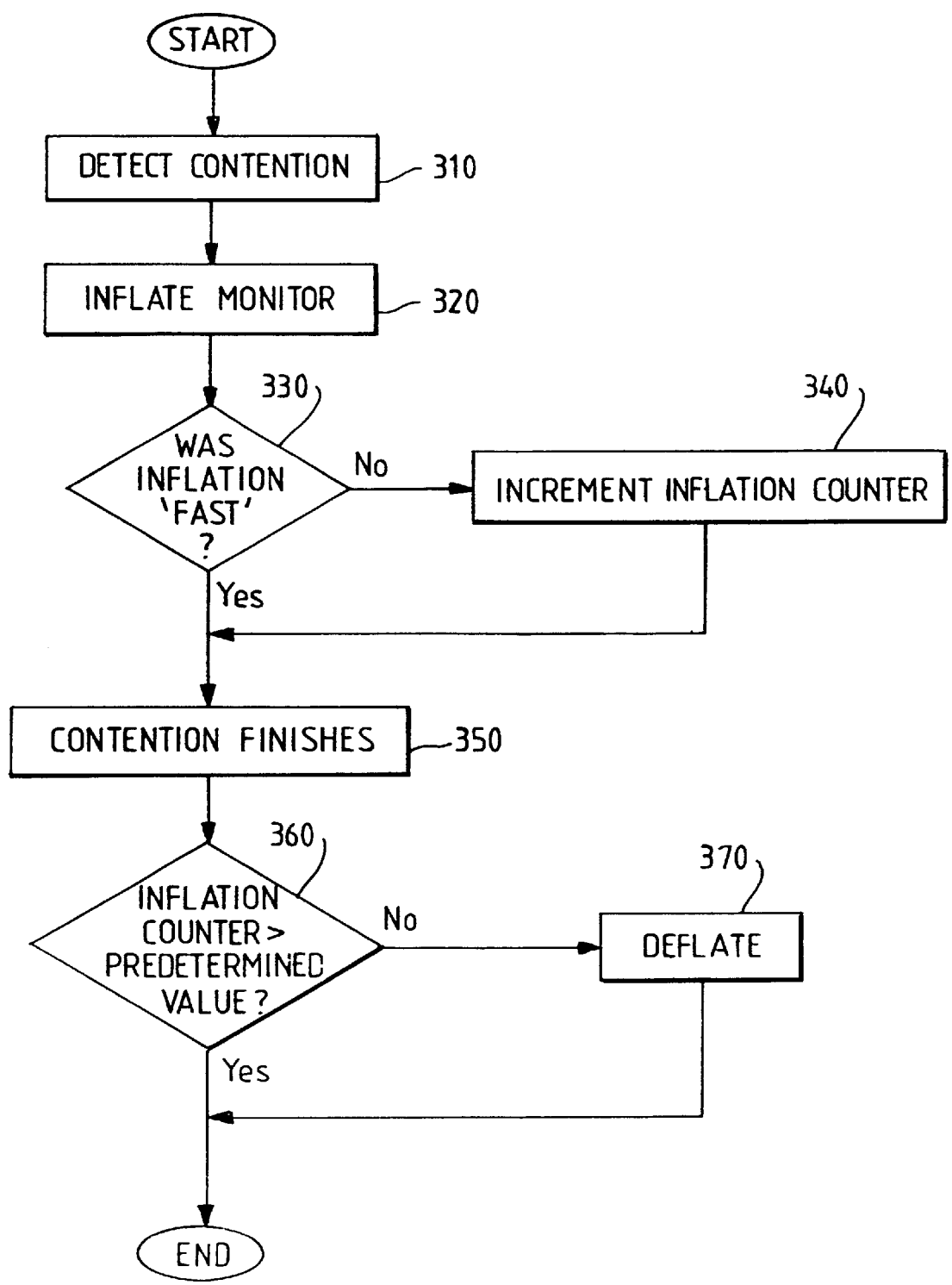
FIG. 3 is a flow chart illustrating inflation and deflation according to a preferred embodiment of the present invention.

FIG. 3 is a flow chart illustrating the inflation and deflation cycle of an object in accordance with a preferred embodiment of the present invention. The method starts with step 310 in which contention for an object is detected, and (assuming that the monitor is not already inflated) this leads to step 320, in which the object monitor is inflated. In the preferred embodiment this inflation is accomplished essentially by means of the technique described in the Onodera et al paper, but any other suitable technique could be used, such as that described in the Bacon et al paper. If the inflation was of the slow type (as determined by step 330) the method proceeds to increment an inflation counter, which is stored in data field 161, 166 in the monitor (step 340).

At some time later, it is assumed that contention ends (step 350), and more particularly the current thread owning the inflated object has finished with it, and there are no more threads waiting on the inflated monitor. As this current thread exits the monitor, the system tests the inflation counter (step 360). If the value stored in this counter is less than a predetermined value, then the system proceeds to deflate the object (step 370), if not, the object remains in the inflated state. It will be appreciated that the step of deflation per se (step 370) can again be performed using the same approach as described in the above mentioned paper by Onodera et al.

The rationale for the above approach is that inflation and deflation are often relatively expensive operations. It is therefore important to determine whether following a period of contention it is worth deflating, using a thin monitor, and then subsequently re-inflating, or rather simply continuing to use the fat monitor. The answer to this question depends on the length of the interval between successive periods of contention. If this interval is long and includes many uncontended locking operations then the benefit of being able to use a flat monitor rather than a fat monitor will outweigh the cost of the deflation and inflation. On the other hand, if this interval is short, the system will expend heavy resources going through repeated deflation/inflation cycles in quick succession (i.e. thrashing) without any compensating benefit.

Looking therefore at FIG. 3, it can be seen that a counter is used to determine whether or not to perform deflation at step 360; if the counter is greater than a predetermined value (=K, say), then no deflation is performed. This counter is incremented each time that inflation occurs (ignoring for the moment the distinction between fast and slow inflation of step 330). Thus assuming the counter starts at zero, then deflation will be performed K times before the test at step 360 is positive, and no further deflation is performed—in other words the object stays inflated from that point on. This will prevent an object from thrashing, since in such a case the value of K will be reached rapidly, after which there is no further deflation.

Returning now to the test in step 330, this arises because synchronisation in Java is actually used for two logically distinct purposes. It can be used firstly to enforce mutual exclusion in terms of object access between different threads, and secondly to provide a timing control (wait/notify) between different threads. In the former contention occurs when access to a particular object is wanted by more than one thread. This is termed slow inflation, and repeated slow inflation is a good indicator that many threads want to access the object. It is in this situation that it is appropriate to turn off deflation. On the other hand, a wait/notify construct automatically results in immediate inflation (i.e. fast inflation), without really indicating a high level of interest in the object by multiple threads. Therefore fast inflation is not necessarily a good predictor of future contention, and so in accordance with the test of step 330, it is not used to increment the inflation counter.

Looking at this another way, the processing overhead for fast inflation is relatively light, since there is no need for an internal monitor wait/notify operation. This is true not only for those fast inflations arising from an application wait/notify, but also for those exceptional cases where lock ownership contention does not require an internal wait/notify. Consequently both of these types of fast inflation are significantly less detrimental to system performance than slow inflations, and so they are not included in the inflation count for determining whether or not to deflate.

Note that the use of the method of FIG. 3 by itself has the drawback that any long-lived object may eventually be inflated K times. From this point onwards, such an object will no longer be deflated, even though it may experience long periods without contention, for which the use of a thin monitor would have brought significant performance benefits.

Thus in principle what is desired is to take the counts obtained from the method of FIG. 3, and divide by time in order to obtain the rate at which the monitor is being inflated—a high rate would then indicate that in future the monitor should not be deflated after contention, whilst a low rate would indicate the converse. However, it is important not to add to the path length of the method of FIG. 3, since this in itself will have an adverse effect on performance.

Figure 4:
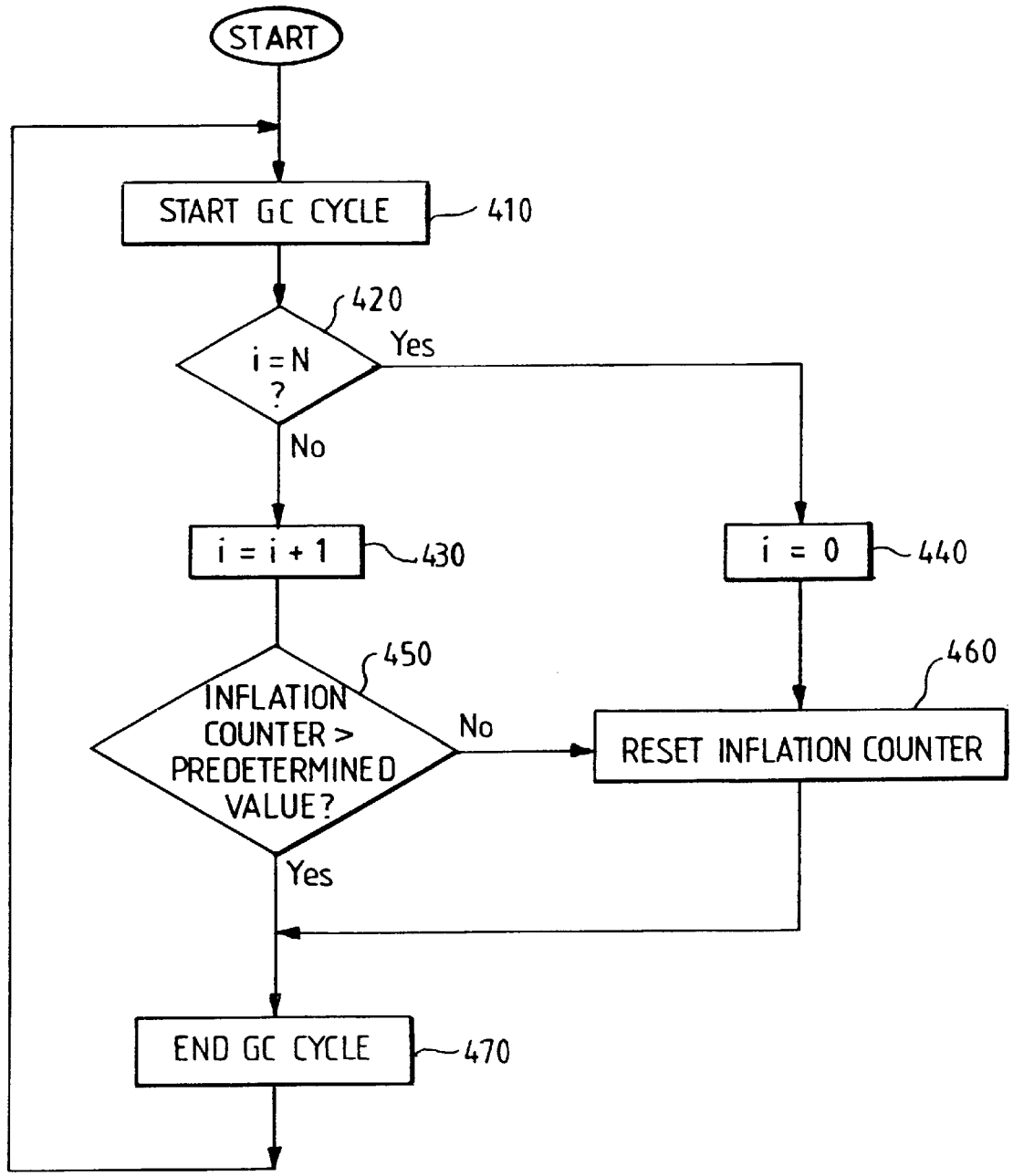
FIG. 4 is a flow chart illustrating the use of the garbage collection cycle to control inflation and deflation according to a preferred embodiment of the invention.

This problem is addressed by the method shown in FIG. 4. The steps shown in FIG. 4 represent additions to the conventional garbage collection (GC) cycle of the JVM. It will be appreciated that the standard GC operations which are not pertinent to an understanding of the present invention are not shown in FIG. 4. It will also be appreciated that the methods of FIGS. 3 and 4 effectively operate in parallel, in the same way that GC is generally interleaved with other JVM operations (NB the method shown in FIG. 4 does not require any modification to the method shown in FIG. 3).

The flowchart of FIG. 4 commences with the start of a garbage collection cycle (step 410). A test is then made (step 420) as to whether a counter (i) has reached a predetermined value (N). Assuming that this is not the case (the counter (i) is initialised to zero at the start of the flowchart), the method then proceeds to step 430, which increments the counter (i) by one. The next step 430 determines whether the inflation counter previously mentioned (i.e. as stored in data fields 161 or 166) exceeds a predetermined value, which matches that in the corresponding test in FIG. 3 (step 360). If this is not the case, the inflation counter is reset (step 460), otherwise the inflation counter is left as is. The garbage collection cycle then ends (step 470), and the system loops back after a suitable interval to the next GC cycle.

Returning now to step 420, eventually the counter (i) will be incremented until it has reached the value of N, and so this test will now take the positive branch. This results in the counter (i) being reset to 0 (step 440), followed by a reset of the inflation counter (step 460) irrespective of its value (i.e. without the test of step 450). The method then continues with the end of the garbage collection cycle (step 470), followed by the loop back as described above.

The processing of FIG. 4 can be understood as effectively transforming the count information in data fields 161, 166 from simple raw counts into an indication of rate. However rather than using any formal clock for this process, the count information is timed instead in terms of garbage collection cycles. Thus for each GC cycle (except for i=N), if the inflation counter is greater than the predetermined value (=K), in other words there have been many inflation/deflation cycles since the last GC cycle, then the inflation counter is not reset (i.e. step 460 is bypassed). Consequently, the test in step 360 of FIG. 3 is always positive, therefore effectively turning deflation off. This is as desired in order to prevent rapidly repeated inflation/deflation cycles (i.e. thrashing). On the other hand, if the inflation counter is below K at step 450, then it gets set back to zero, allowing a subsequent test at step 360 to give a negative result. The reset of the inflation counter at step 460 ensures that an object with a low inflation/deflation rate will always appear as such, irrespective of how long it lives, thereby allowing it to deflate properly at step 370.

The processing thus described successfully distinguishes a long-lived object having a steady low inflation/deflation rate from a long-lived object having a steady high inflation/deflation rate. However, the contention rate for an object is not necessarily fixed with time. Clearly an increase in the inflation/deflation rate will eventually result in positive tests at steps 360 and 450, resulting in switching off deflation. Switching deflation back on in the converse situation, i.e. a decrease in the inflation/deflation rate, is the purpose of counter (i) in FIG. 4. Thus this counter ensures that every N GC cycles the inflation counter is automatically returned to zero. This effectively switches deflation back on for the object. The object can then continue in this state if the inflation/deflation rate has fallen sufficiently since deflation was previously turned off. Alternatively, if the inflation/ deflation rate is still high, then at the next GC cycle, test 450 will be positive, and deflation will be turned off again.

The use of GC cycles to effectively clock the inflation/deflation rate has two main advantages. Firstly, because GC cycles occur more frequently during periods of heavy memory usage, the rate information effectively becomes more indicative of the number of inflation/deflation cycles per unit memory operation, rather than per unit time. This is a desirable characteristic to avoid an increased tendency to turn off deflation during periods of high overall system activity, since otherwise the inflation counters would tend towards higher values (and hence switching off deflation), even if there were still a large number of memory operations being performed without contention. Secondly the additional processing power required to implement the above scheme is very small. Thus the only additions to the standard inflation cycle are steps 330 and 340, incrementing the inflation counter for slow inflation. This simply involves updating a data field 161, 166 in a monitor which is already being processed as part of the inflation operation. Likewise, the only addition to the standard deflation operation is the test of step 360, which again simply requires checking a data field 161, 166 in a monitor which is already being processed.

The steps shown in FIG. 4 are of course extra work during the GC cycle. However, they represent a relatively minor addition to the general operation of the garbage collector, which must already review each object monitor to check its ownership to see if it can be deleted. Furthermore, the number of system-wide garbage collection cycles is naturally much smaller than the number of object-based inflation/deflation cycles. (n.b. in passing it is noted that whilst efficient garbage collection is very important to Java performance, this is more because standard garbage collection suspends all threads, rather than the actual operations performed within a garbage collection process).

It will be appreciated of course that, whilst the flowchart of FIG. 4 has been described in relation to just one monitor, step 450 and, where appropriate, step 460, are performed in respect of all inflated monitors. In contrast, the count (i) is kept at a system level. In addition, the relative timing of FIGS. 3 and 4 will generally differ for different monitors. For example, in some cases a single period of contention may span multiple GC cycles. This would result in the counter potentially getting reset inbetween inflation and the subsequent deflation.

Figure 5:
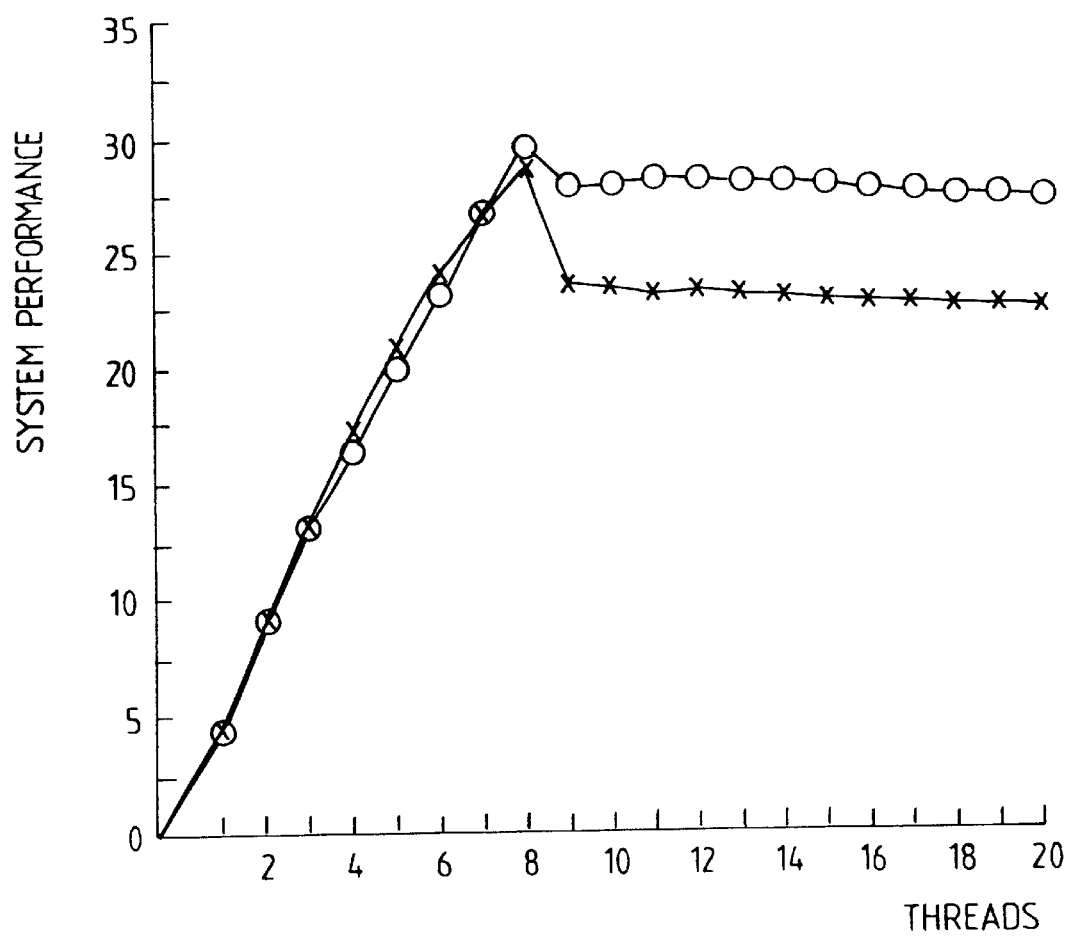
FIG. 5 is a diagram illustrating the performance improvement achieved in one embodiment of the invention.

FIG. 5 illustrates performance data indicating the benefit provided by the invention. In this graph, the y-axis represents performance level, and the x-axis represents number of threads. The crosses chart prior art system performance when deflation is turned off automatically after contention ends (i.e. as if step 350 in FIG. 3 is always followed by step 370), whereas the circles chart system performance in accordance with a preferred embodiment of the present invention in which deflation is selectively turned off using the test of step 360 and the complementary operations of FIG. 4.

The test results are based on an 8-processor system, and it can be seen that performance increases essentially linearly with number of threads up to 8, as each thread can be allocated its own processor. However, for more than eight threads, the prior art performance deteriorates, indicating relatively poor scalability. One reason for this is contention for resources by different threads (note that the numbers of threads involved are much larger than in the prior art tests of Onodera et al). These performance problems are very significantly alleviated by implementing the selective deflation of the present invention as described above, as demonstrated by the much better performance levels associated therewith.

It will be appreciated that many possible variations on the above implementation exist. Thus in the preferred embodiment the same value of K is used in the test of FIG. 3 step 360 as in the test of FIG. 4 step 450, but this is not necessarily the case. For example, the comparison value might be higher in the latter test than in the former. The effect of this would be that borderline cases for no deflation would be reassessed in the next cycle, rather than having to wait for counter (i) to reach N. Another possibility is that the values of the inflation counters might be tracked over several GC cycles, thereby allowing more sophisticated algorithms to be used to determine whether or not to discontinue deflation. A further possibility is that rather than ignore fast inflations from the inflation rate counter (step 330), they may be counted, but possibly with different weight. In addition, in the preferred embodiment the values of K and N are 2500 and 100 respectively, but these will be sensitive to performance tuning considerations. Thus the best value of K depends on the relative benefit of using a flat monitor rather than a fat monitor, compared to the cost of inflation and deflation for any particular implementation. Likewise, the best value of N depends on the relative benefit of turning on deflation for an object which now has low contention, compared to the cost of turning on deflation for an object which in fact still has high contention (this will typically depend on the application). Thus these parameters can be tuned for any particular implementation and environment. Many other such possible variations will also be apparent to the skilled person.

What is claimed is:

1. A method of operating an object-based multi-threaded computing system having a cyclic garbage collection strategy and including an object locking system having (i) a first mode in which access by a single thread without contention to an object is controlled by a monitor internal to said object, and (ii) a second mode in which access by multiple threads with contention to said object is controlled by a monitor external to said object, and wherein for any given object a transition from the first mode to the second mode is termed inflation, and a transition from the second mode to the first mode is termed deflation, said method including the steps of:

entering a period of contention for an object in said first mode;

inflating said object to said second mode;

updating an inflation rate value for said object, said value corresponding to a length of an interval between successive periods of contention, and said value being maintained over successive garbage collection cycles;

ending a period of contention for said object;

comparing the inflation rate value against a first predetermined value;

deflating or not deflating said object, based on the result of the comparison; and resetting the inflation rate value at the next garbage collection cycle of the system.

2. The method of claim 1, where in said inflation rate value represents the number of inflation/deflation cycles inbetween two successive garbage collection cycles.

3. The method of claim 2, wherein said updating step comprises incrementing the inflation rate value by one.

4. The method of claim 1, wherein said inflation rate value is stored in said monitor external to said object.

5. The method of claim 1, wherein said step of resetting the inflation rate value comprises testing to see if the inflation rate value is greater than a second predetermined value, and if so, not performing the step of resetting the inflation rate value.

6. The method of claim 5, wherein on a periodic basis the step of resetting the inflation rate value is performed irrespective of whether or not the inflation rate value is greater than the second predetermined value.

7. The method of claim 5, wherein said second predetermined value is equal to said first predetermined value.

8. The method of claim 1, wherein the inflation rate value is not updated if said step of inflating results from a wait/notify operation being performed on the object.

9. The method of claim 1, wherein said object-based multi-threaded computing system includes a Java virtual machine.

10. An object-based multi-threaded computing system having a cyclic garbage collection strategy and including an object locking system having (i) a first mode in which access by a single thread without contention to an object is controlled by a monitor internal to said object, and (ii) a second mode in which access by multiple threads with contention to said object is controlled by a monitor external to said object, and wherein for any given object a transition from the first mode to the second mode is termed inflation, and a transition from the second mode to the first mode is termed deflation, said computer system including:

means for entering a period of contention for an object in said first mode;

means for inflating said object to said second mode;

means for updating an inflation rate value for said object, said value corresponding to a length of an interval between successive periods of contention, and said value being maintained over successive garbage collection cycles;

means for ending a period of contention for said object;

means for comparing the inflation rate value against a first predetermined value;

means for deflating or not deflating said object, based on the result of the comparison; and means for resetting the inflation rate value at the next garbage collection cycle of the system.

11. The system of claim 10, where in said inflation rate value represents the number of inflation/deflation cycles inbetween two successive garbage collection cycles.

12. The system of claim 11, wherein said means for updating comprises means for incrementing the inflation rate value by one.

13. The system of claim 10, wherein said inflation rate value is stored in said monitor external to said object.

14. The system of claim 10, wherein said means for resetting the inflation rate value comprises means for testing to see if the inflation rate value is greater than a second predetermined value, and if so, the inflation rate value is not reset.

15. The system of claim 14, wherein on a periodic basis the inflation rate value is reset irrespective of whether or not the inflation rate value is greater than the second predetermined value.

16. The system of claim 14, wherein said second predetermined value is equal to said first predetermined value.

17. The system of claim 10, wherein the inflation rate value is not updated if the inflating results from a wait/notify operation being performed on the object.

18. The system of claim 10, wherein said object-based multi-threaded computing system includes a Java virtual machine.

19. A computing system having:

a plurality of objects, each object including an internal monitor to control access to said object in a first mode of object locking;

a plurality of monitors, each monitor controlling access to a corresponding one of said plurality of objects in a second mode of object locking, and including an inflation counter which is incremented by a transition from said first mode of object locking to said second mode of object locking, said inflation counter keeping track of a value which corresponds to a length of an interval between successive periods of contention, said value being maintained over successive garbage collection cycles; and a garbage collector including means for resetting said inflation counter.

20. A computer program product for use in an object-based multi-threaded computing system having a cyclic garbage collection strategy and including an object locking system having (i) a first mode in which access by a single thread without contention to an object is controlled by a monitor internal to said object, and (ii) a second mode in which access by multiple threads with contention to said object is controlled by a monitor external to said object, and wherein for any given object a transition from the first mode to the second mode is termed inflation, and a transition from the second mode to the first mode is termed deflation, said computer program product including computer readable instructions recorded in a storage medium for implementing the steps of:

entering a period of contention for an object in said first mode;

inflating said object to said second mode;

updating an inflation rate value for said object, said value corresponding to a length of an interval between successive periods of contention, and said value being maintained over successive garbage collection cycles;

ending a period of contention for said object;

comparing the inflation rate value against a first predetermined value;

deflating or not deflating said object, based on the result of the comparison; and resetting the inflation rate value at the next garbage collection cycle of the system.

* * * * *